(12) United States Patent
Lees et al.

(10) Patent No.: US 7,162,499 B2
(45) Date of Patent: Jan. 9, 2007

(54) LINKED VALUE REPLICATION

(75) Inventors: William B. Lees, Redmond, WA (US); Jeffrey B. Parham, Redmond, WA (US); Mark R. Brown, Seattle, WA (US); Donald J. Hacherl, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 356 days.

(21) Appl. No.: 09/765,542

(22) Filed: Jan. 19, 2001

(65) Prior Publication Data

US 2002/0099728 A1     Jul. 25, 2002

Related U.S. Application Data

(60) Provisional application No. 60/212,950, filed on Jun. 21, 2000.

(51) Int. Cl.
*G06F 17/30*      (2006.01)

(52) U.S. Cl. .................. 707/203; 707/204; 707/103 R

(58) Field of Classification Search ............... 707/203, 707/103 R, 209, 200
See application file for complete search history.

(56) References Cited

U.S. PATENT DOCUMENTS

| | | | | |
|---|---|---|---|---|
| 5,588,147 A | 12/1996 | Neeman et al. ............ 707/1 |
| 5,649,194 A | 7/1997 | Miller et al. ............ 707/200 |
| 5,675,787 A | 10/1997 | Miller et al. ............ 707/104.1 |
| 5,774,552 A | 6/1998 | Grimmer .................. 380/25 |
| 5,787,262 A * | 7/1998 | Shakib et al. ............ 709/205 |
| 5,787,441 A * | 7/1998 | Beckhardt ................ 707/201 |
| 5,787,442 A | 7/1998 | Hacherl et al. ........... 707/201 |
| 5,806,074 A * | 9/1998 | Souder et al. ............. 707/201 |
| 5,832,225 A | 11/1998 | Hacherl et al. ........... 709/223 |
| 5,832,275 A | 11/1998 | Olds ....................... 717/173 |
| 5,832,487 A * | 11/1998 | Olds et al. .................. 707/10 |
| 5,832,506 A | 11/1998 | Kuzma .................... 707/200 |
| 5,926,816 A * | 7/1999 | Bauer et al. ................ 707/8 |
| 5,968,121 A | 10/1999 | Logan et al. ............... 707/10 |
| 5,968,131 A * | 10/1999 | Mendez et al. ........... 709/246 |
| 6,052,724 A | 4/2000 | Willie et al. ............. 709/223 |
| 6,058,401 A * | 5/2000 | Stamos et al. ............ 707/201 |
| 6,138,124 A * | 10/2000 | Beckhardt ................ 707/201 |
| 6,212,557 B1* | 4/2001 | Oran ....................... 709/221 |
| 6,247,017 B1 | 6/2001 | Martin .................... 707/102 |
| 6,295,541 B1* | 9/2001 | Bodnar et al. ............ 707/203 |
| 6,301,589 B1* | 10/2001 | Hirashima et al. ........ 707/204 |
| 6,343,299 B1* | 1/2002 | Huang et al. ............. 707/203 |
| 6,377,950 B1 | 4/2002 | Peters et al. ............... 707/10 |
| 6,446,092 B1* | 9/2002 | Sutter ...................... 707/203 |
| 6,516,327 B1* | 2/2003 | Zondervan et al. ....... 707/200 |
| 6,529,917 B1* | 3/2003 | Zoltan .................... 707/201 |

(Continued)

OTHER PUBLICATIONS

Microsoft Corporation, "Implementing Database Replication with JRO", Microsoft Corporation, Jan. 1999, pp. 1-10.*

(Continued)

*Primary Examiner*—Khanh B. Pham
(74) *Attorney, Agent, or Firm*—Merchant & Gould P.C.

(57) ABSTRACT

A network computer maintains a directory of objects having multi-valued attributes. The attributes are comprised of individual linked values having conflict-resolution data that indicates a change to an object at an attribute-value level. A second network computer stores a replica of the directory in which a replica of the objects is maintained. The computers replicate the objects in the directories and update the individual linked values of the attributes. Replication conflicts are identified and resolved with the conflict-resolution data at the attribute-value level of the objects.

40 Claims, 12 Drawing Sheets

U.S. PATENT DOCUMENTS

| | | | | |
|---|---|---|---|---|
| 6,532,479 | B1 * | 3/2003 | Souder et al. | 707/201 |
| 6,539,381 | B1 * | 3/2003 | Prasad et al. | 707/10 |
| 6,647,393 | B1 | 11/2003 | Dietterich et al. | 707/102 |
| 6,865,576 | B1 * | 3/2005 | Gong et al. | 707/100 |
| 6,901,433 | B1 | 5/2005 | San Andres et al. | 709/216 |

OTHER PUBLICATIONS

Byte.com, "Notes Replication: Outstanding in its Field", Byte Magazine Article, Apr. 1996, pp. 1-3.*

Byte.com, New Replication Options in Access, Oracle and Notes, Byte Magazine Article, oct. 1995, pp. 1-4.*

Lowe Norris, "Windows 2000 Active Directory", O'Reilly Publishcation, 1st edition, Jan. 2000.*

S. Sarin et al., "A Flexible Algorithm for Replication Directory Management", IEEE CH2706-0/89/0000/0456 pp. 456-464 (1989).

K.C. Wong et al., "Directory Replication in Distributed Systems", SIGForth '89 pp. 123-127 (1989).

M. Xiong et al., "Mirror: A State-Conscious Concurrency Control Protocol for Replicated Real-Time Databases", IEEE Catalog No. 90CH2783-9 pp. 20-29 (1999).

S. Sonntag et al., "Adaptability Using Reflection", IEEE 1060-3425/94 pp. 383-392 (1994) Proceedings of the Twenty-Seventh Annual Hawaii International Conference on Systems Sciences.

W. Zhou et al., "Distributed Object Replication in a Cluster of Workstations", IEEE 0-7695-0589-2/00 pp. 889-894 (2000).

Wong K.C. et al., Directory in Distributed Systems, in *The Proceedings of the first annual Workshop for the ACM Special Interest Group on Forth—SIGForth '89*, 1989, pp. 123-127.

Xiong, Ming et al., MIRROR: A State-Conscious Concurrency Control Protocol for Replicated Real-Time Databases, IEEE Electron Devices Society 1990 *Solid-State Sensor and Actuator Workshop*, Hilton Head Island, SC, Jun. 4-7, 1990, pp. 20-29.

Sonntag, Susann et al., Adaptability Using Reflection in *Proceedings of the Twenty-Seventh Hawaii International Conference on System Sciences*, 1994, pp. 383-392.

Sarin, Sunil et al., A Flexible Algorithm for Replicated Directory Management, *The 9th International Conference on Distributed Computing Systems*, IEEE 1989, pp. 456-464.

Zhou, Wanlei et al., Distributed Object Replication in a Cluster of Workstations, IEEE 2000, pp. 889-894.

Joshua J. Bloch, Dean S. Daniels, and Alfred Z. Spector. "A weighted voting algorithm for replicated directions," Journal of the ACM, 34(4):859-909, ACM, Oct. 1987.

Mullender, S., van Rossurn, G., Tanenbaum, A., van Renesse, R. and van Staveren, H., "Amoeba: A Distributed Operating System for the 1990s", IEEE Computer 23, 5 (May 1990), 44-53.

T. Mann, A. Hisgen, and G. Swart, "An Algorithm for Data Replication," Report 46, DEC System Research Center, Palo Alto, Calif., 1989.

Ganesha Beedubail, Udo Pooch. "An Architecture for Object Replication in Distributed Systems," Proceedings of the International Conference on Parallel and Distributed Processing Techniques and Applications, PDPTA'97, Department of Computer Science, Texas A&M University, Technical Report (TR 96-006), Mar. 1996.

Haengrae Cho, "Catalog Management in Heterogeneous Distributed Database Systems," Communications, Computers and Signal Processing, 1997. '10 Years Pacrim 1987-1997-Networking the Pacific Rim'. IEEE, Aug. 1997.

Charles Severance, "Could LDAP be the Next Killer DAP?, " *Computer*, vol. 30, No. 8, pp. 88-89, Aug., 1997.

Peter J. Keleher, "Decentralized Replication Mechanisms in Deno, " University of Maryland Computer Science Department, *Technical Reports from UMIACS, and Technical Reports of the Computer Science Department*, CS-TR-3940 UMIACS, UMIACS-TR-98-54, Oct. 1998. (http://hdl.handle.net/1903/970).

J. Ordille, B. Miller, "Distributed Active Catalogs and Meta-Data Caching in Descriptive Name Services," Thirteenth International IEEE Conference on Distributed Computing Systems, pp. 120-129. May 1993.

H. V. Jagadish, M. A. Jones, D. Srivastava, and d. Vista. Flexible list management in a directory. In Proceedings of the Seventh International Conference on Information and Knowledge Management (CIKM), p. 10-19, ACM, Washington, DC, Nov. 1998.

Roger Y. M. Cheung, "From Grapevine to Trader: The Evolution of Distributed Directory Technology, " Proceedings of the 1992 conference of the Centre for Advanced Studies on Collaborative research-vol. 2, pp.375-389, 1992, Ontario, Canada 1992.

B. Acevedo, L. Bahler, E. N. Elnozahy, V.Ratan,and M. E. Segal. Highly available directory services in DCE. In Proceedings of the Symposium on Principles of Distributed Computing (PODC'95), pp. 387-391, Aug. 1995.

"NetOp® Policy Server, Version 3.0, Quick Guide," Document revision: 2004313, 1981-2005 Danware Data A/S, CrossTec Corp. (http://www.crossteccorp.com/support/resource/nps_quick_install.pdf).

Keith K.S. Lee, Y.H. Chin, "A New Replication Strategy for Unforeseeable Disconnection under Agent-Based Mobile Computing Systems, " 1998 International Conference on Parallel and Distributed Systems (ICPADS'98) p. 164, IEEE, 1998.

Hennings Maass, "Open Mobility Management Platform With Directoy-Based Architecture And Signalling Protocols," Open Architectures and Networks Programming, pp. 72-87, IEEE 1998.

Yair Amir, "Replication Using Group Communications Over a Partitioned Network, " Ph. D. Dissertation, Institute of Computer Science, The Hebrew University of Jerusalem, Israel, 1995.

Howes, Timothy A., "The Lightweight Directory Access Protocol: X. 500 Lite," Technical Report CITI TR 95-8, University of Michigan, Jul. 1995.

Bruce Walker, Gerald Popek, Robert English, Charles Kline, and Greg Thiel. The Locus distributed operating system. In Proceedings of the 9th Symposium on Operating Systems Principles, Operating Systems Review, pp. 49--69, ACM, Oct. 1983.

M.F. Kaashoek, A.S. Tanenbaum, and K. Verstoep, "Using Group Communication to Implement a Fault-Tolerant Directory Service," Proceedings of th 13th International Conference on Distributed Computing Systems, pp. 130139, IEEE, May 1993.

Joao Ferreira, Jose Luis Borbinha, Jose Delgado, "Using LDAP in a Filtering Service for a Digital Library," 5th Delos Workshop, Budapest, Nov. 1997.

J M Bennett, M A Bauer, "An Analysis of Replication Strategies for X.500-like Distributed Directories," Workshop on the Management of Replicated Data, IEEE Computer Society Press, Nov. 1990, pp. 137-142.

"Microsoft Active Directory Service Interfaces: ADSI Open Interfaces for Managing and Using Directory Services", Microsoft Corporation, 1999.

"Active Directory Service Interfaces-The Easy Way to Access and Manage LDAP-Based Directories (Windows NT 4.0)," Microsoft Corp., Feb. 1997. (http://www.microsoft.com/technet/archive/winntas/maintain/adsildap.mspx).

John Carter, Anand Ranganathan, SaiSusaria, "Khazana An Infrastructure for Building Distributed Services," Proceedings of th ICDCS '98, IEEE, May 1998.

Microsoft Corporation, "Comparing Microsoft Active Directory to Novell's NDS" Sep. 1998, pp. 1-14. Internet citation retrieved Nov. 22, 2005; http://msdn.microsoft.com/library/default.asp?url=/library/en-us/dnactdir/html/msdn_activedirvsnds.asp.

David Chappell, "New distributed services give Window NT a boost in large networks", May 1998, pp. 1-7. Internet citation retrieved Nov. 22, 2005; http://www.byte.com/art/9705/sec5/art I.htm.

Austin et al., "Technique for Replicating Distributed Directory Information," IBM Technical Disclosure Bulletin, IBM Corp., vol. 33, No. 12, May 1, 1991, pp. 113-120.

Ashfield et al., "System-indepedent file management and distributiion services," IBM Systems Journal, vol. 28, No. 2, 1989, pp. 241-259.

Weider et al., "LDAP Multi-Master Replication Protocol," Network Working Group, Nov. 1997; http://www.watersprings.org/pub/id/draft-ietf-asid-ldap-mult-mast-rep-02.txt.

* cited by examiner

LINKED VALUE REPLICATION

RELATED APPLICATION

This application claims priority to U.S. Provisional Application No. 60/212,950, filed Jun. 21, 2000, entitled "Link Value Replication", to Brown et al.

TECHNICAL FIELD

This invention relates to network systems and, in particular, to linked multi-valued object attribute replication in a network-wide directory service.

BACKGROUND

In a network-wide directory service maintaining objects having multi-valued attribute lists, such as a mail distribution list or a personnel list for a security-based system, simultaneous updates from more than one networked data-entry site can cause a replication conflict. For example, Active Directory™ is an enterprise-wide directory service in Windows® 2000 using a state-based, multi-master replication model that is susceptible to replication conflicts with respect to its object store structure. Windows™ 2000 is an operating system licensed by Microsoft Corporation of Redmond, Wash.

In a network-wide partitioned directory, each domain controller in a separate domain of the network maintains a copy of a partition of the directory which typically contains those objects that are pertinent to only a particular domain. Replication defines that a change to a directory made on one computer will change the directory on all computers in a network having a replica of the directory. A copy of the contents of one directory partition on a specific domain controller is identified as a replica. Replication updates replicas among the domain controllers that store the same directory partitions. Convergence defines that if a network system is allowed to reach a steady state in which no new updates are occurring, and all previous updates have been completely replicated, all replicas ideally converge to the same set of values.

A multi-master replication model defines that several servers (e.g., the domain controllers) in a network system can contain writeable replicas of an object that is intended to be kept consistent between the servers. Master replicas accept updates independently without communicating with other master replicas. If updates cease and replication continues, all replicas of an object at each server will ideally be updated to the same value. Replication propagates changes made on any specific domain controller to all other domain controllers in the network that store the directory partition in which a change occurs.

A state-based replication model defines that each master applies updates, both originating and replicated, to its replica as they arrive. Replication is derived from the current state of the source replica at hand. Each directory partition replica stores per-object and per-attribute data to support replication.

An alternative to a state-based replication model is a log-based replication model. In a conventional log-based replication system, each master server keeps a log of any updates that it originates. When replicating, each master server communicates its log to every other replica. When receiving a log at a replica, the replica applies the log, bringing its own state more up-to-date.

With a conventional state-based replication model, there can be conflicts with object attribute value updates because the lowest level of granularity for updates is at the attribute level of an object, and not at the attribute value level. Even though an attribute may contain multiple values (i.e., a multi-valued attribute), all of the values are considered as a single unit for the purpose of replication. The following example, described with reference to FIGS. 1 and 2, illustrates the occurrence of a replication conflict when implementing a network-wide directory service with a conventional state-based replication model.

FIG. 1 shows a network architecture 100 having a directory service that maintains objects associated with a mail distribution list. The network 100 has a first domain controller 102, computer A, and a second domain controller 104, computer B, that are interconnected via a communications network 106. Computer 102 has a directory 108 that stores a mail group 110(A) which has multiple associated group objects, such as object 112(A). Group object 112(A), identified as object M, is associated with mail group 110(A) and identifies the individual recipients of a mail distribution list in the mail group.

Computer 104 has a directory 114 which is a replica of directory 108 in computer 102. Directory 114 stores a mail group 110(B) which has an associated group object 112(B), also identified as object M because it is a replica of object 112(A) stored in directory 108 at computer 102.

The group object 112 has a data structure 116 that illustrates data stored in the object. The data structure 116 stores object properties, identified as attributes 118, and attribute values for each attribute, identified as metadata 120. The object 112 has a name attribute 122 that identifies an association with mail group 110. Metadata 124 indicates the association with the mail group and also includes a latest version number and an update timestamp for the name attribute 122. The version number, v1, indicates a first version of the name attribute 122 and the timestamp, t1, indicates when the first version of the attribute was created.

The object 112 has an identifier attribute 126 that associates a global unique identifier (GUID) in metadata 128 for the object. Each instance of the object, 112(A) and 112(B), has a different and unique GUID within network 100. Metadata 128 also includes a latest version number, v1, and an update timestamp, t1, for the identifier attribute 126.

The object 112 also has a multi-valued members attribute 130 that associates the individual recipients in the mail distribution list. Metadata 132 for the members attribute includes a latest version number, v1, and an update timestamp, t1. Metadata 132 also includes a link table reference to a data structure 134. Link table 134 maintains the linked values (e.g., the recipients in the mail distribution list) for the multi-valued members attribute 130.

Link table 134 identifies the object owning the link table at source 136 which indicates that object M owns the link table. Each recipient in the mail distribution list is identified as a referenced object at destination 138 which, in this example, indicates two recipients. Link table 134 also identifies the associated object attribute for each destination 138 at linkID 140. In this example, linkID 140 identifies that each recipient 138 is associated with the members attribute 130.

If the list of recipients 138 is changed on computer A, then computer B needs to be updated with the changes. During replication, computer A sends computer B the entire contents of the members attribute 130, which includes the entire link table 134, because the lowest level of granularity for conventional replication updates is at the attribute level of an object, and not at the attribute value level. Although only a single value within the members attribute value list may be changed (i.e., a recipient is deleted, added, and/or updated), computer A cannot convey to computer B which recipient has changed. Computer A can only convey that some value in the members attribute 130 has been changed.

The problem is compounded for a large number of attribute values and by the scale of the network. Computer B can only receive the entire contents of the members attribute 130 and either compare the new object attribute with what computer B has stored locally to update the change, or computer B can delete its entire local copy of the members attribute and update the attribute with the new copy of members from computer A. Either case presents an efficiency problem for computer B. The problem is further compounded for multiple networked sites each having replica to be updated.

Furthermore, a conflict occurs during replication when a multi-valued object attribute, such as members, is updated at different networked sites within a relatively short amount of time before a scheduled replication. This is identified as a replication latency period. Changes made to a multi-valued attribute simultaneously, or within the replication latency period, can cause a replication convergence conflict that will result in the loss of a data update.

If two independent attribute changes converge from different networked sites, and a first attribute change prevails in a conflict resolution over a second attribute change, then the values of the first attribute change will replace all of the values of the second attribute change. This policy is acceptable for an attribute that is single-valued, or when it makes sense to change all of the values of an attribute together as a group. However, replication conflicts can result in lost data when it is desirable that individual values of a multi-valued object attribute replicate independently.

FIG. 2. continues the example and illustrates how a replication conflict can occur between two objects having updated multi-valued attributes and how resolution of the conflict can result in the loss of one of the data updates. Initially, as shown in FIG. 1, computer A has an object 112(A) with a multi-valued members attribute 130. The attribute has two values, recipient1 and recipient2, in link table 134. Computer B also has an up-to-date replica of object M.

In FIG. 2, a data administrator at computer A deletes recipient1 from the mail distribution list 138(A) in link table 134(A) and, as illustrated, recipient1 no longer exists. The data administrator also adds a new recipient3 to the mail distribution list 138(A) as indicated by 200. Metadata 132(A) for members attribute 130(A) is updated to version2 (v2) of the mail distribution list occurring at time2 (t2) as indicated by 202.

Within a replication latency period, such as five minutes or less, for example, a second data administrator at computer B adds a new recipient4 to the mail distribution list 138(B) as indicated by 204. Metadata 132(B) for members attribute 130(B) is updated to version2 (v2) of the mail distribution list occurring at time3 (t3) as indicated by 206.

When computers A and B replicate directories 108 and 114, respectively, there will be a replication conflict because the members attribute was updated at both network sites during a replication latency period. Conventionally, the conflict can be resolved by a policy that allows the most frequent writer to prevail first followed by the last writer prevails. That is, the higher version number prevails first, followed by the latest timestamp. In the example, both network sites have a version2 (v2) in metadata 132 for members attribute 130. Thus, computer B wins the replication conflict because the latest timestamp is time3 (t3) which is later than time2 (t2) at computer A. Other resolution policies may resolve replication conflicts with only a version number, or with only a timestamp.

To replicate, computer A updates metadata 132(A) for members attribute 130(A) by replacing all of the values for the attribute. That is, the entire link table 134(A) is replaced in directory 108 in computer A with link table 134(B) from computer B. Although not shown specifically, the resultant replica for object 112 at both of the network sites is that shown for computer B. The mail distribution list at both computers A and B (i.e., the recipient values 138) will include recipient1, recipient2, and recipient4. The update at computer A to remove recipient1 and add recipient3 is lost in the resolution of the replication conflict.

Simultaneous attribute updates at different networked sites can cause a replication convergence that requires a conflict resolution in a state-based replication model because objects are not necessarily replicated in the order in which they are updated. Replication conflicts arise because the lowest level of granularity for updates is at the attribute level of an object, and not at the attribute value level. Even though an attribute may contain multiple values, all of the values are considered as a single unit for the purpose of replication. Updates to individual values of multi-valued attributes need to be accounted for during replication to avoid a replication conflict that results in lost data.

SUMMARY

A network system domain controller maintains a directory of objects having multi-valued attributes. The attributes have multiple linked values and the individual values have conflict-resolution data that indicates a change to an object at an attribute-value level. The conflict-resolution data includes a version number that identifies a latest version of an individual value, an update timestamp that identifies when an individual value is updated or changed, and a creation timestamp that identifies when an individual value is created.

A second network domain controller stores a replica of the directory in which a replica of the objects is maintained. The domain controllers replicate the objects in the directories and update the individual linked values of the attributes. Replication conflicts are identified and resolved with the conflict-resolution data at the attribute-value level of the objects. Additionally, the individual values have an associated deletion timestamp that either indicates the existence of a value in an object, or indicates that a particular value has been identified to be deleted from a multi-valued attribute.

BRIEF DESCRIPTION OF THE DRAWINGS

The same numbers are used throughout the drawings to reference like features and components.

DETAILED DESCRIPTION

The following technology describes systems and methods to individually replicate multi-valued object attributes. A linked value replication model described herein replicates attribute values individually for multi-valued object attributes and reduces the possibilities of replication conflicts when the attribute values converge at all replicas within a network.

Figure 1:
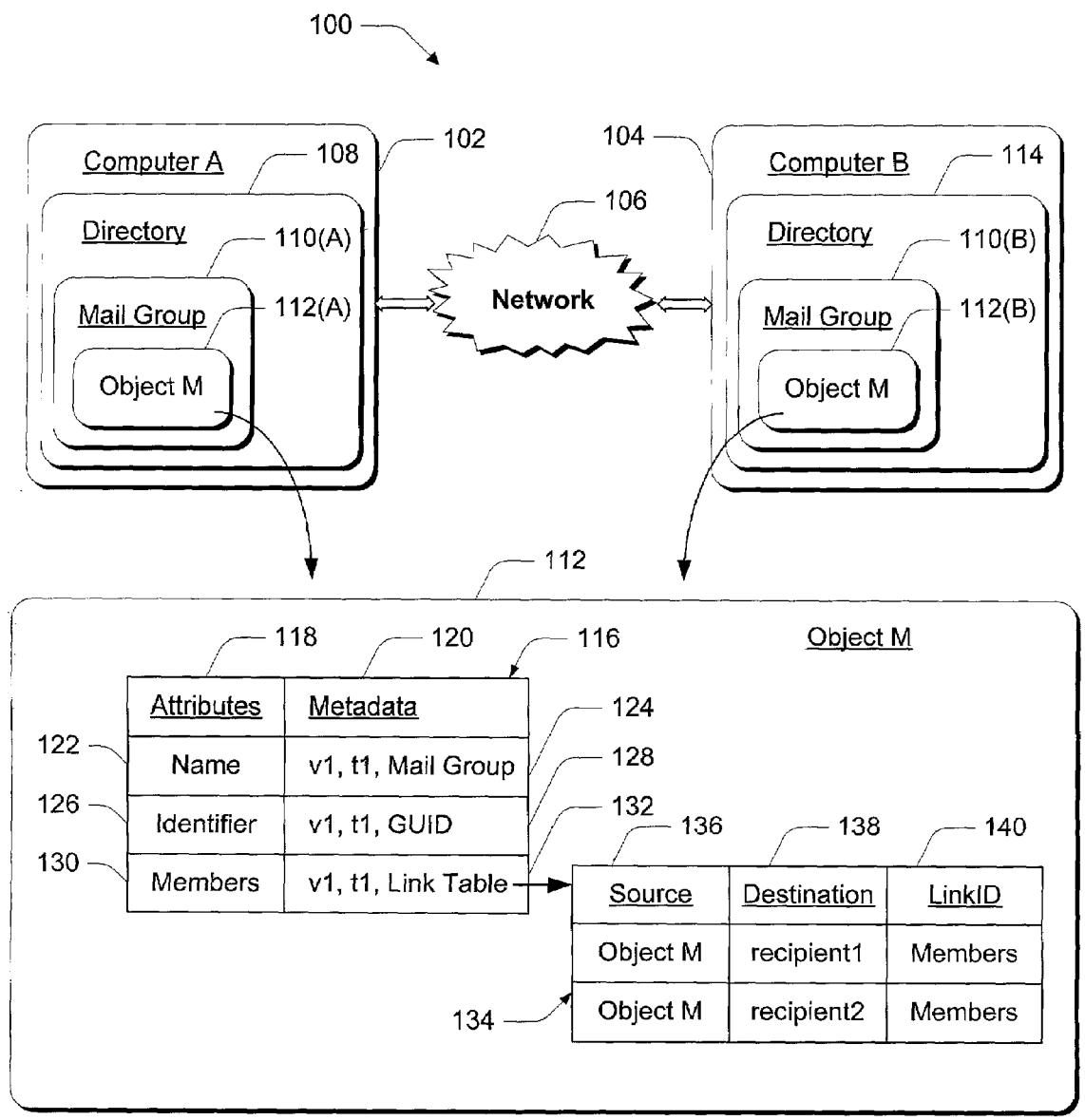
FIG. 1 illustrates an example of conventional state-based replication.
Figure 2:
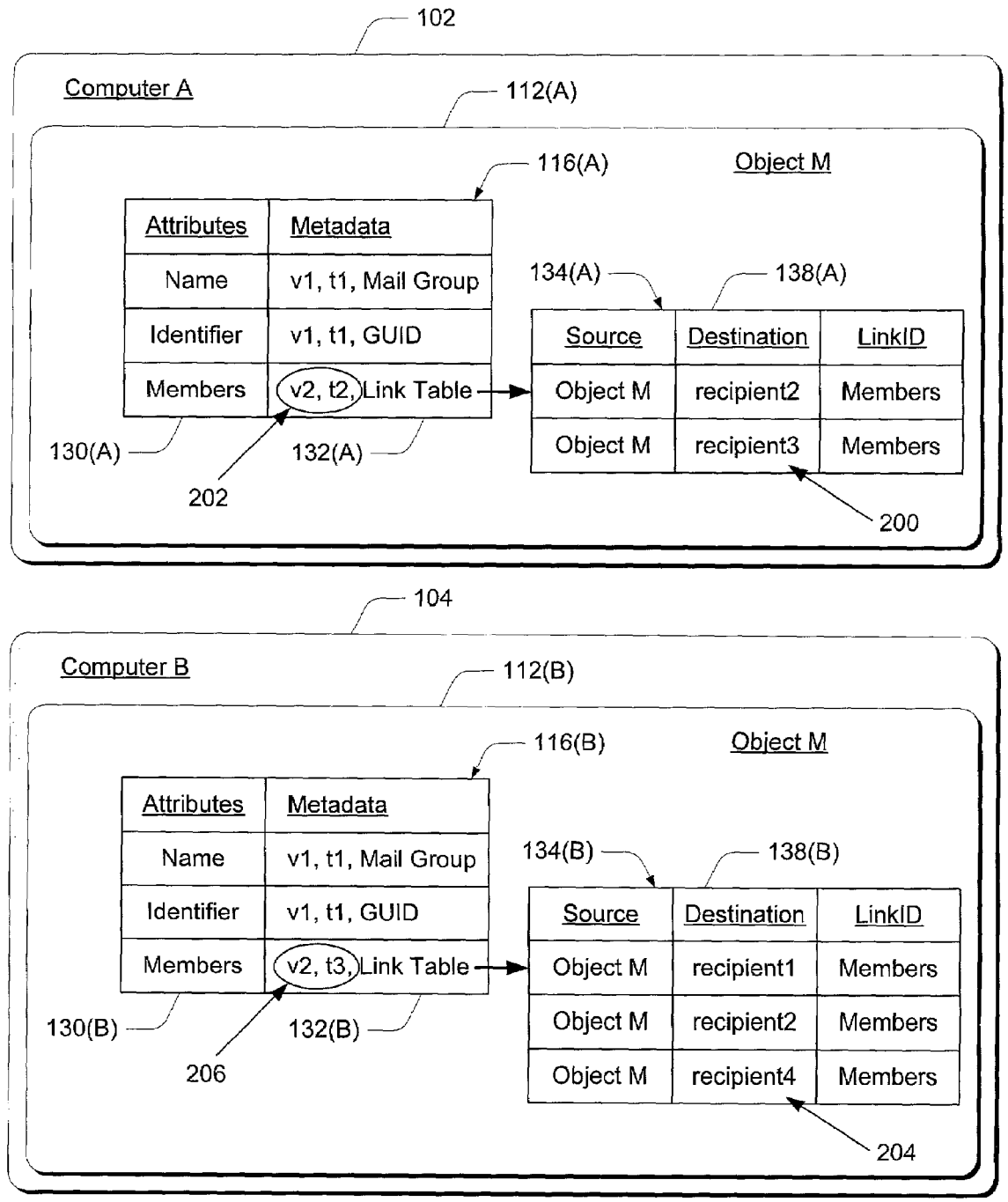
FIG. 2 illustrates an example of conventional state-based replication.
Figure 3:
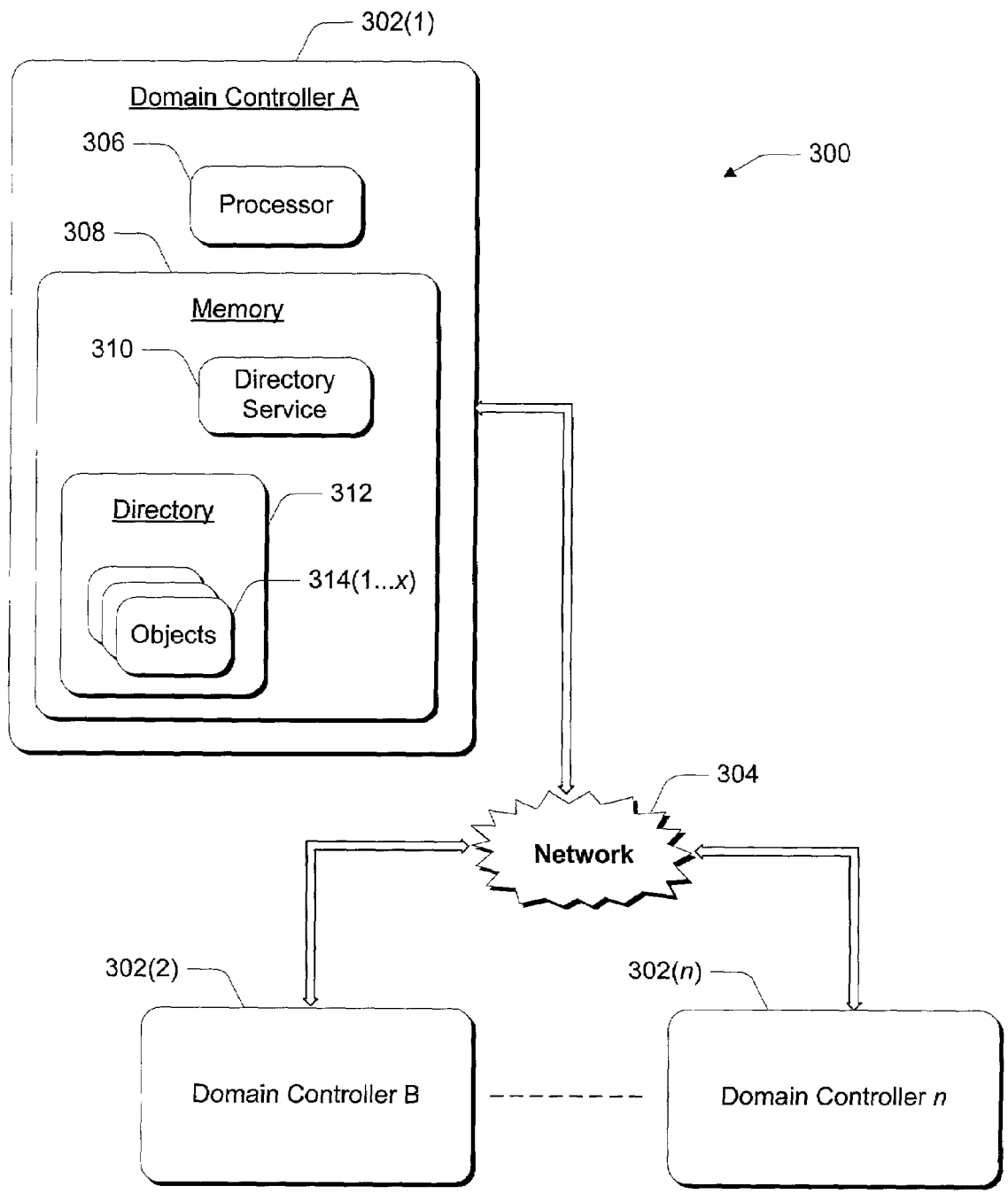
FIG. 3 is a block diagram of a network architecture.

FIG. 3 shows a network architecture 300 having any number of domain controllers 302(1 . . . n) that implement a distributed network-wide directory service and that are interconnected via a communications network 304. The network domain controllers 302 locally administrate the network 300 at a particular network branch site. Network domain controller 302(1) is an exemplary computing device of the other domain controllers (i.e., 302(2 . . . n)) in the network 300. The domain controllers 302 have a processor 306 and a memory 308. The memory 308 stores a directory service 310 that is executable on the processor 306.

The memory 308 also stores a directory 312 of any number of objects 314(1 . . . x) that are distributed among the domain controllers 302. An update or change to an object 314 at any one domain controller can be replicated to any of the other domain controllers in the network 300 that store a copy of the same object 314. The domain controllers 302 communicate replication changes via the communications network 304. See the description of "Exemplary Computing System and Environment" below for specific examples of the network architectures and systems, computing systems, and system components described herein.

Figure 4:
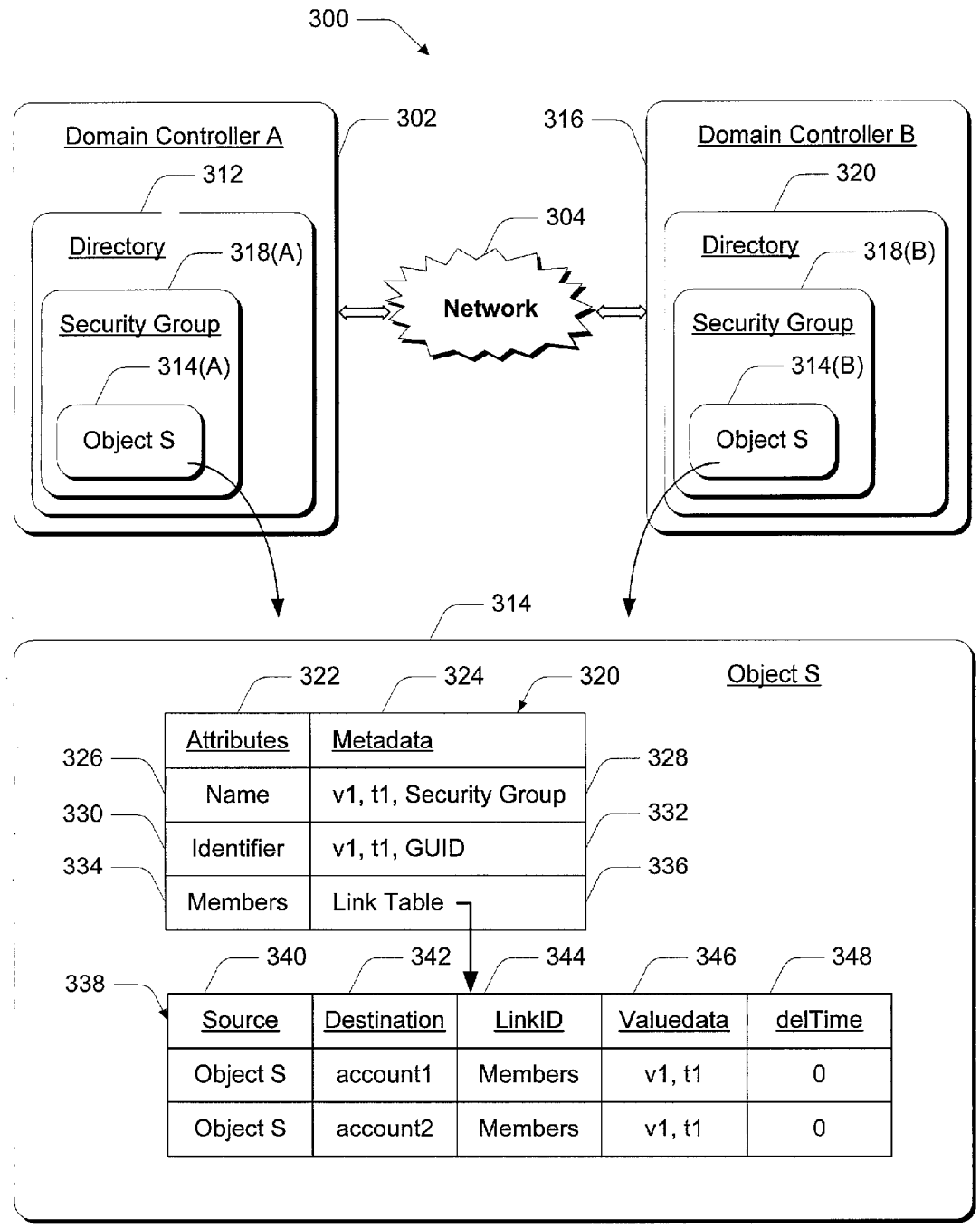
FIG. 4 illustrates data structures in the FIG. 3 network architecture.

FIG. 4 shows an example of object data structures in network architecture 300. Network 300 has a first domain controller A, identified as 302, and a second domain controller B, identified as 316, that are interconnected via the communications network 304. Domain controller A has a directory 312 that stores a security group 318(A) which has multiple associated group objects, such as object 314(A). The group object 314(A), identified as object S, is associated with the security group 318(A) and identifies individual accounts in a security list.

Domain controller B has a directory 320 which is a replica of directory 312 in domain controller A. Directory 320 stores a security group 318(B) which has an associated group object 314(B), also identified as object S because it is a replica of object 314(A) stored in directory 312 at domain controller A.

The group object 314 has a data structure 320 that illustrates data stored in the object. The data structure 320 stores object properties, identified as attributes 322, and attribute values for each attribute, identified as metadata 324. The object 314 has a name attribute 326 that identifies an association with security group 318. Metadata 328 indicates the association with the security group and also includes a latest version number and an update timestamp for the name attribute 326. The version number, v1, indicates the first version of the name attribute 326 and the timestamp, t1, indicates when the first version of the attribute was created.

The object 314 has an identifier attribute 330 that associates a global unique identifier (GUID) in metadata 332 for the object. Each instance of the object, 314(A) and 314(B), has a different and unique GUID within network 300. Metadata 332 also includes a latest version number, v1, and an update timestamp, t1, for the identifier attribute 330.

The object 314 also has a multi-valued members attribute 334 that associates the individual accounts in the security list. Metadata 336 for the members attribute does not include a latest version number and update timestamp for reasons that will become apparent below. Metadata 336 includes a link table reference to a data structure 338. Link table 338 maintains the linked values (e.g., the accounts in the security list) for the multi-valued members attribute 334.

Link table 338 identifies the object owning the link table at source 340 which indicates that object S owns the link table. Each account in the security personnel list is identified as a referenced object at destination 342 which, in this example, indicates two accounts. Link table 338 also identifies the associated object attribute for each destination 342 at linkID 344. In this example, linkID 344 identifies that each account 342 is associated with the members attribute 334.

The linked values (i.e., accounts 342) of the members attribute 334 are like virtual attributes in that the values have identifying and defining data and exist in the context of the containing object. Link table 338 maintains valuedata 346 for each account 342 that includes a latest version number and an update timestamp. In addition, link table 338 stores a deletion timestamp at delTime 348 to identify if an account 342 is to be deleted from the link table.

A zero value for deletion timestamp 348 indicates that a value (i.e., an account 342) is present in link table 338. A deletion timestamp 348 that indicates a time identifies that the associated value 342 has been identified to be deleted from the linked value list. That is, a non-zero value for deletion timestamp 348 indicates that a value is in an absent state and will not be rendered for display. A deletion timestamp 348 is necessary as an identifier for record purposes when the directory is replicated to indicate that a deletion of a value was performed at a networked site. If the value is simply deleted and removed from the linked value list without an identifier to indicate as such, there would be no record to update the next directory when the network sites replicate.

Multi-Valued Attribute Replication

Figure 5:
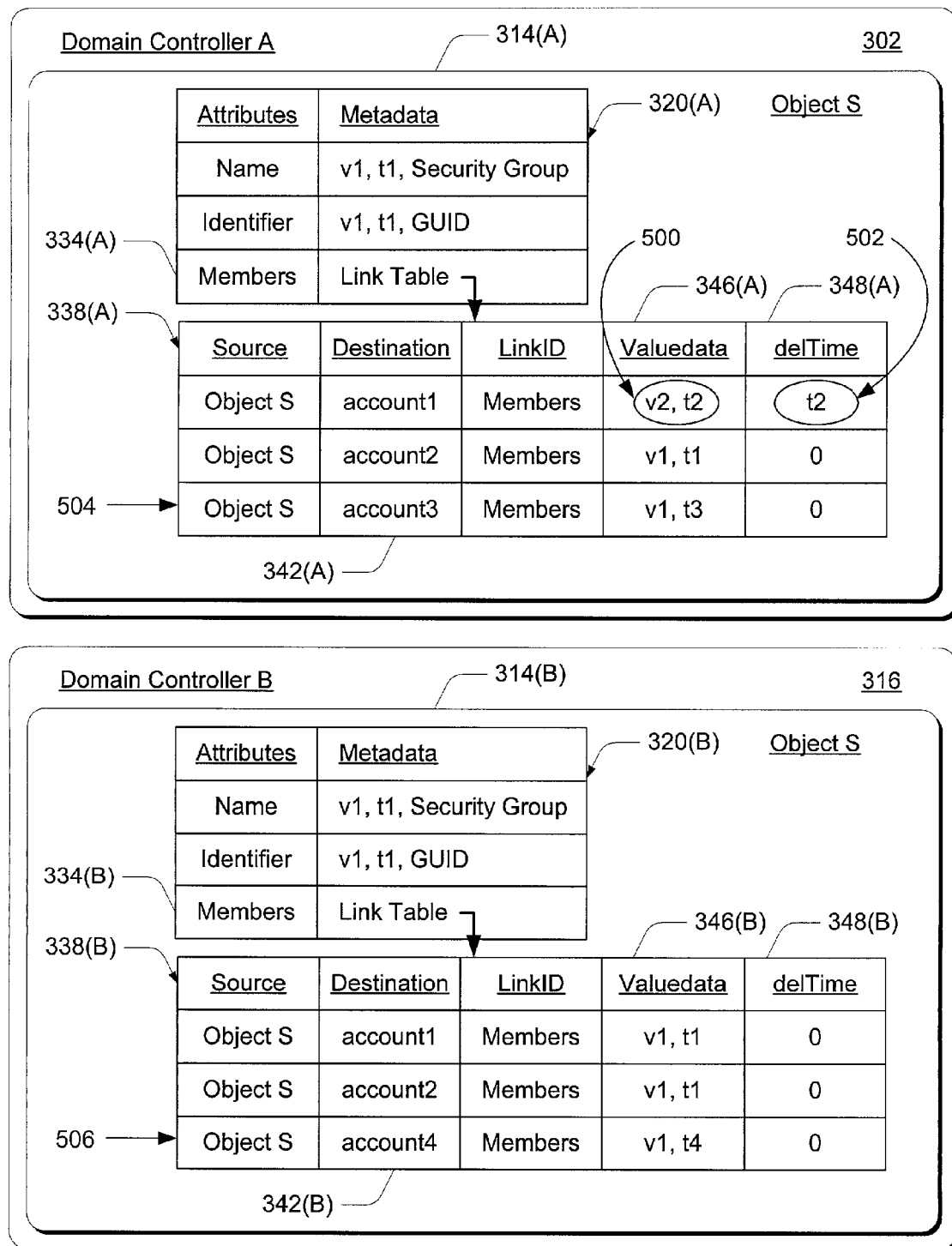
FIG. 5 illustrates data structures in the FIG. 3 network architecture.

FIG. 5 illustrates how a replication conflict is avoided when two objects having an updated multi-valued attribute are replicated in a network implementing a linked value replication model. Initially, as shown in FIG. 4, domain controller A has an object 314(A) with a multi-valued members attribute 334. The attribute has two values, account1 and account2, in link table 338. Domain controller B also has an up-to-date replica of object S.

In FIG. 5, a data administrator at domain controller A deletes account1 from the security list 342(A) in link table 338(A). As illustrated, account1 is not removed from link table 338(A), but rather identified as having been deleted. Valuedata 346(A) for account1 is updated to version2 (v2) of the value occurring at time2 (t2) as indicated by 500. To identify that account1 has been deleted, deletion timestamp 348(A) is updated at time2 (t2) as indicated by 502.

The data administrator also adds a new account3 to the security list 342(A) at domain controller A as indicated by 504. Valuedata 346(A) for account3 is initialized to version1 (v1) of the value occurring at time3 (t3).

Within a replication latency period, a second data administrator at domain controller B adds a new account 4 to the security list 342(B) as indicated by 506. Valuedata 346(B) for account4 is initialized to version1 (v1) of the value occurring at time4 (t4).

Figure 6:
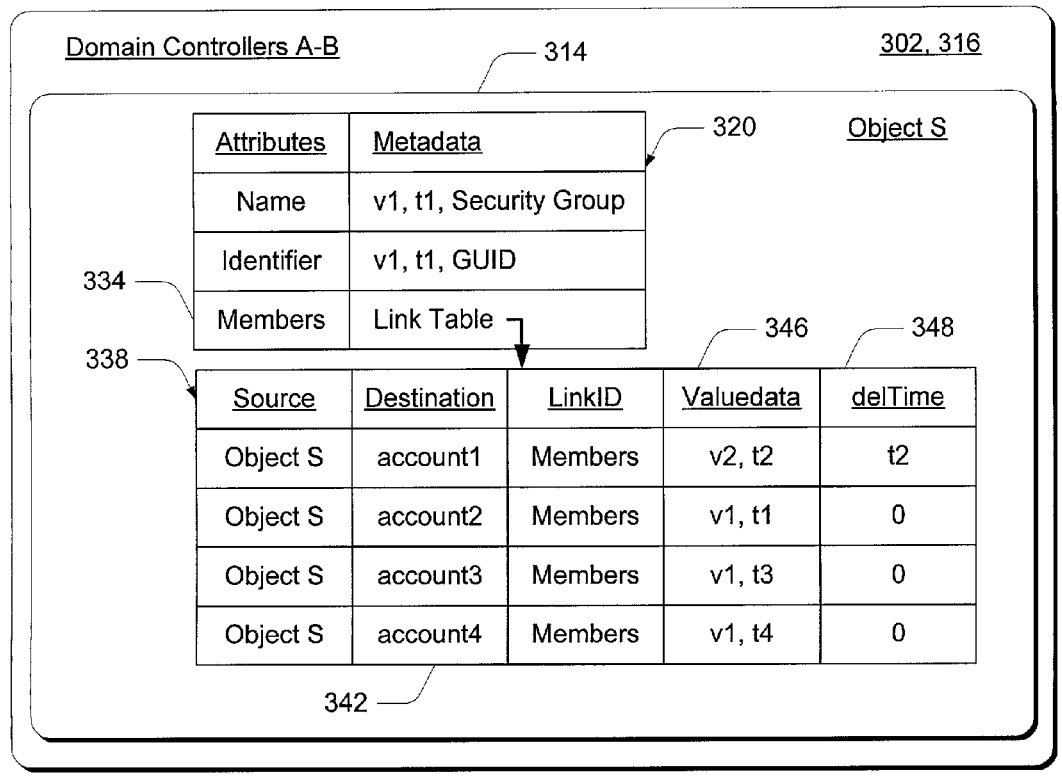
FIG. 6 illustrates data structures in the FIG. 3 network architecture.

FIG. 6 illustrates that when domain controllers A and B replicate directories 312 and 320, respectively (FIG. 4), both of the value updates are accounted for in the resultant link table 338. Neither update is lost in resolving a replication conflict because the level of replication granularity is at the attribute value level, rather than at the attribute level. The update at domain controller A (delete account1 and add account3) and the update at domain controller B (add account4) do not cause a replication conflict because each account 342 has a different combination of version number and update timestamp in valuedata 346.

After domain controllers A and B replicate, and a designated period of time identified as the "tombstone lifetime", the value account1 is removed (actually deleted) from link table 338 by a separate process that recognizes the value as having been identified for deletion. A tombstone lifetime is the period of time that deletions exist in a directory before being removed. The process of removing a value that has been identified for deletion is called "garbage collection".

Link Collision

Figure 7:
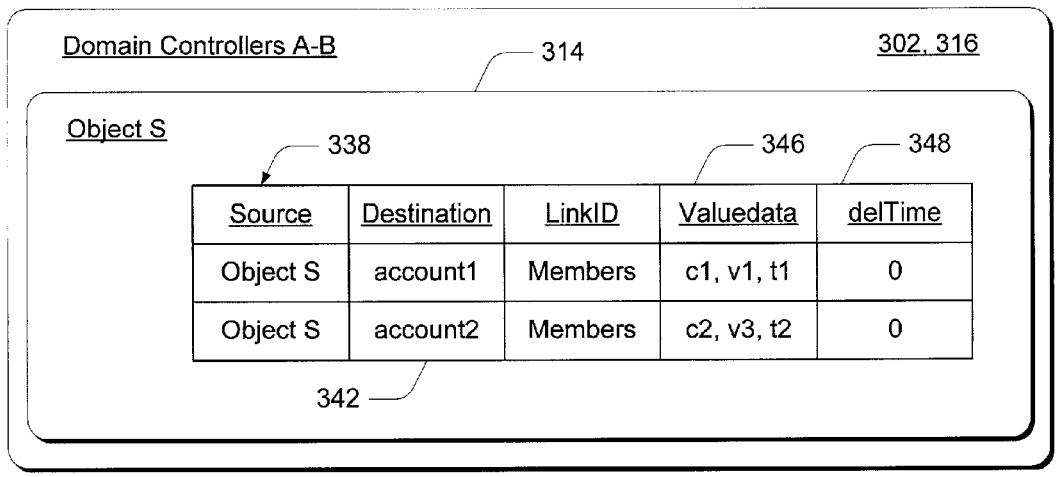
FIG. 7 illustrates data structures in the FIG. 3 network architecture.
Figure 8:
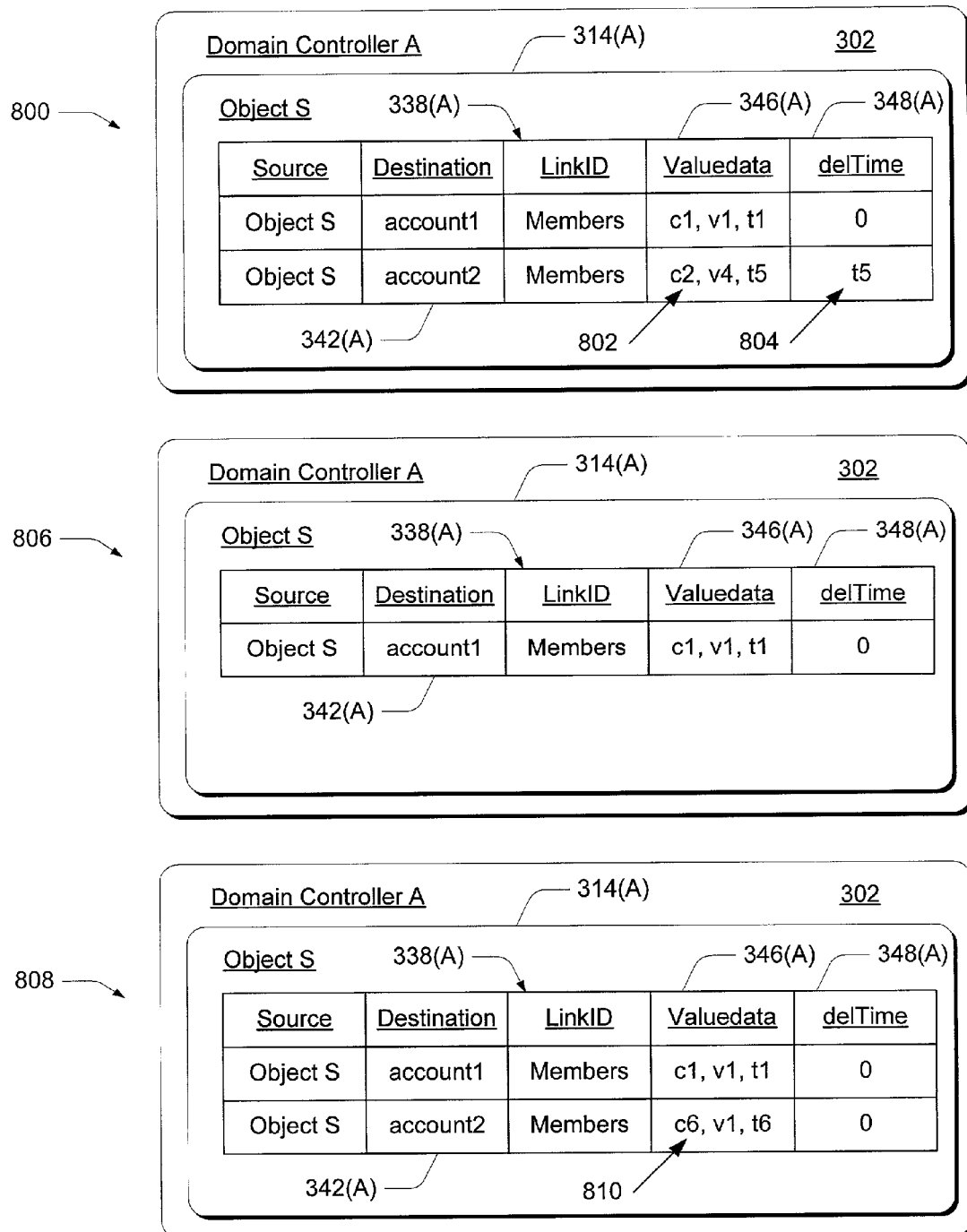
FIG. 8 illustrates data structures in the FIG. 3 network architecture.

FIGS. 7 and 8 illustrate that providing a creation timestamp for an attribute value 342 distinguishes incarnations of the values to avoid data loss during a "link collision". A link collision occurs when a value is deleted (i.e., garbage collected) and then re-created within a replication latency period. A creation timestamp is included in valuedata 346 at the value level to prevent losing a re-created value during resolution of a replication conflict.

Initially, as shown in FIG. 4, domain controller A has an object 314(A) with a multi-valued members attribute 334. The attribute has two values, account1 and account2, in link table 338. Domain controller B also has an up-to-date replica of object S. FIG. 7 also shows domain controllers A and B each having an up-to-date replica of object S. For simplification, only link table 338 for each object 314 is shown in the figure.

A creation timestamp, identified with a "c", is included in valuedata 346 for each account 342 to indicate the creation time of each value. As shown, account1 was created at time c1 and version1 (v1) of account1 occurred at time1 (t1). Account2 was created at time c2 and version3 (v3) of account2 occurred at time2 (t2). Creation timestamps can be derived independently without having to correlate or synchronize time with other replicas stored on different computers.

FIG. 8 shows three instances of object 314(A) in domain controller A. At instance 800, a data administrator at domain controller A deletes account2 from the security list 342(A) in link table 338(A). Valuedata 346(A) for account 2 is updated to version4 (v4) of the value occurring at time5 (t5) as indicated by 802. To identify that account2 has been deleted, deletion timestamp 348(A) is updated at time5 (t5) as indicated by 804.

At instance 806 of object 314(A) in domain controller A, the process of garbage collection recognizes that account2 has been identified for deletion and removes account2 from link table 338(A). The process of garbage collection occurs before replication of domain controller A with domain controller B.

At instance 808 of object 314(A) in domain controller A, the data administrator re-creates account2 which is added to the link table 342(A). Valuedata 346(A) indicates that account2 was created at time c6 and version1 (v1) of account2 occurred at time6 (t6). The version number is initialized as version1 because account2 is a new value added to the link table 338(A).

When domain controllers A and B replicate after account2 was deleted and then re-created at domain controller A, there will be a replication conflict to resolve because valuedata 348 for account2 has changed from the initial state of c2, v3, t2 (FIG. 7) to c6, v1, t6 shown in FIG. 8 at 810. Without the creation timestamp, the replica on domain controller B would prevail in the replication conflict because account2 was initially identified as version3 (v3), and after having been re-created, is identified as version1 (v1) on domain controller A. If domain controller B prevails, the new account2 created at domain controller A would be lost data. However, the replication conflict is resolved in favor of domain controller A because creation timestamp c6 is later than the initial creation timestamp c2 at domain controller B.

Replication Transition from Attribute-Level to Attribute Value-Level

Figure 9:
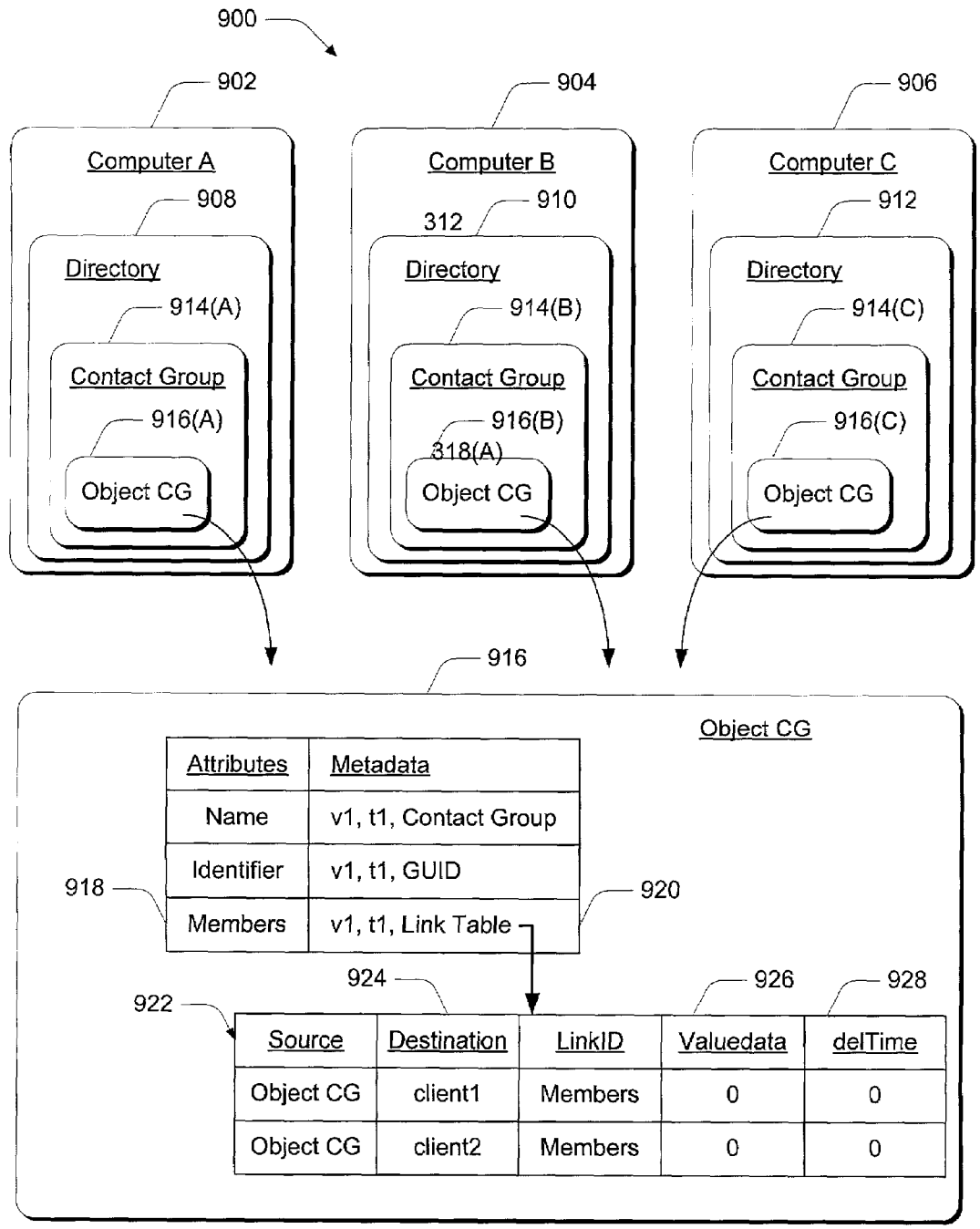
FIG. 9 illustrates a network architecture and a data structure.
Figure 10:
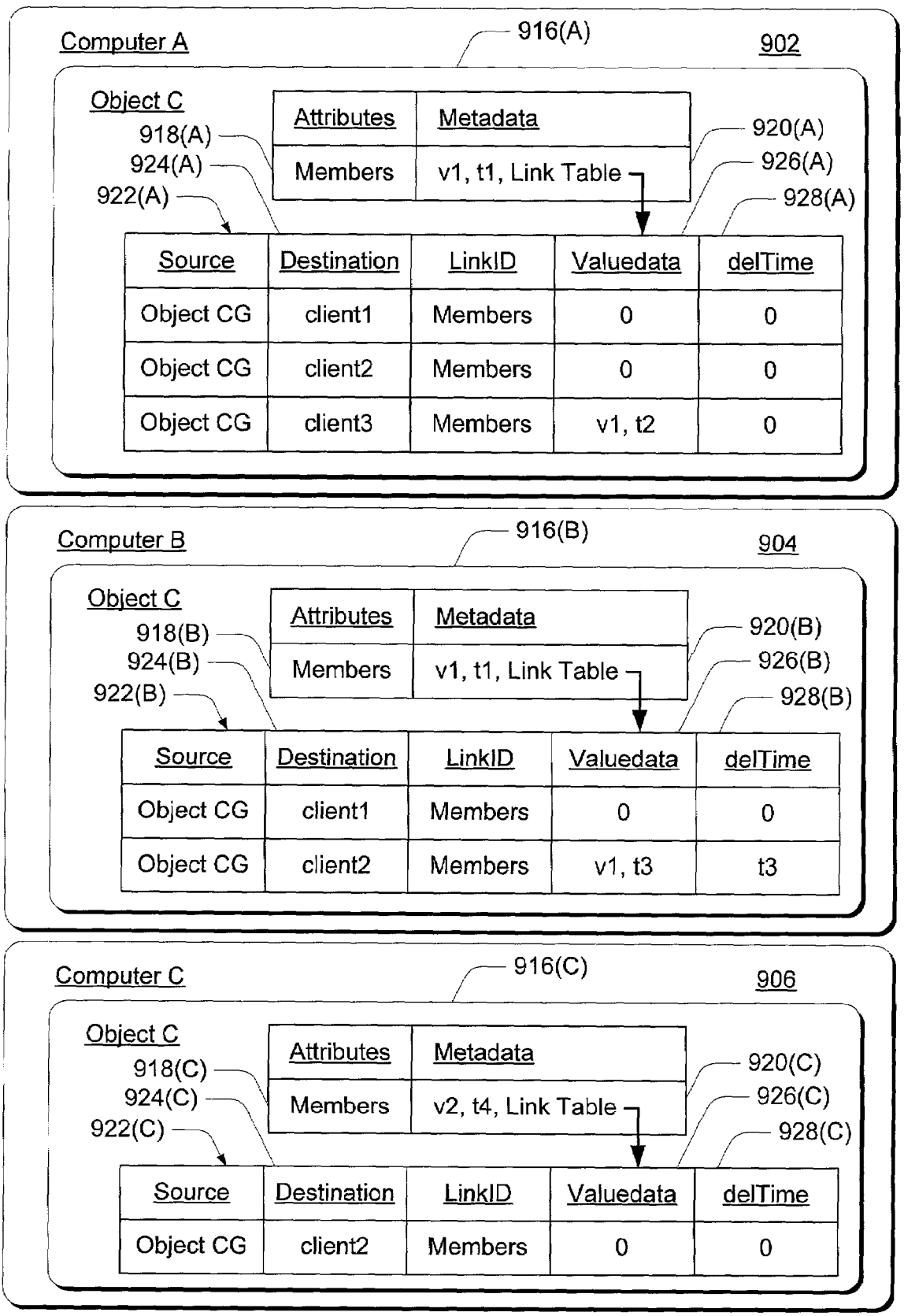
FIG. 10 illustrates data structures in the FIG. 9 network architecture.
Figure 11:
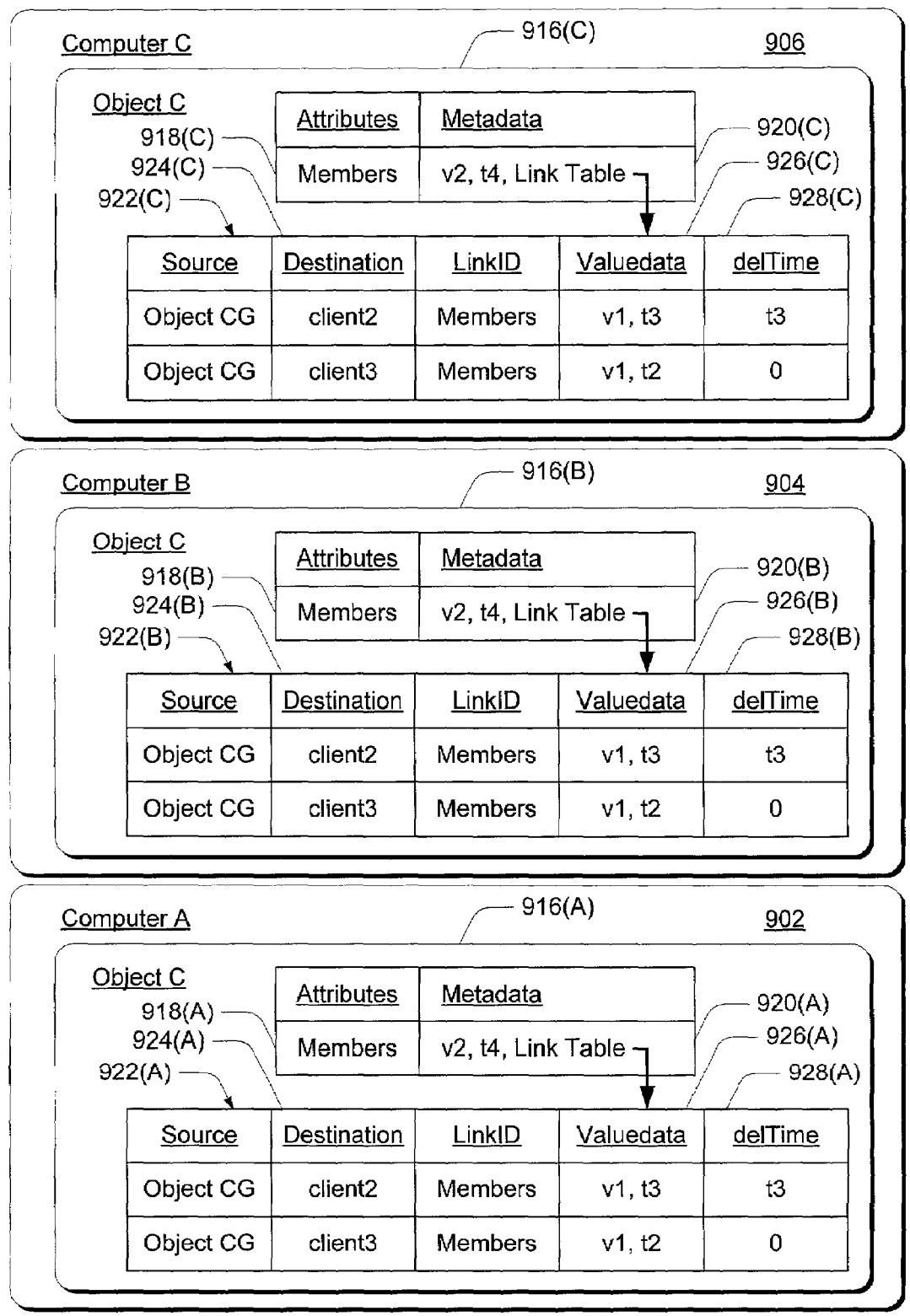
FIG. 11 illustrates data structures in the FIG. 9 network architecture.

FIGS. 9, 10, and 11 illustrate an example of managing the architectural incompatibilities between directory partitions that are replicated with a conventional state-based replication model (i.e., replicated at the attribute level), and updated directory partitions that can be replicated with the linked value replication model described herein (i.e., replicated at the attribute value level). The linked value replication model accounts for changes at both the attribute level and the attribute value level to integrate the directory partitions for the two replication models. Replication transition with the linked value replication model does not require a manual database conversion, as is typically required of an administrator when implementing a new database model. Conventional replication at the attribute level is identified as "legacy replication" where "legacy" defines a state-based replication model directory partition.

FIG. 9 shows a network 900 with three networked domain controllers 902, 904, and 906 (computers A, B, and C). The domain controllers are interconnected via a communications network (not shown). The network 900 and domain controllers A, B, and C are examples of the network 300 and domain controllers 302 described above and shown in FIG. 3.

The computers A, B, and C have a directory 908, 910, and 912, respectively. Each directory stores a replica of a contact group 914 which contains a group object 916. The group object 916, identified as object CG, is associated with the contact group 914 and identifies individual clients in a contact list.

The group object 916 has attributes and metadata as described in relation to object 314 shown in FIG. 4. The object 916 has a multi-valued members attribute 918 that associates the individual clients in the contact list. Metadata 920 for the members attribute includes a link table reference to a data structure 922. Link table 922 maintains the linked values (e.g., the clients 924 in the contact list) for the multi-valued members attribute 918.

Link table 922 maintains valuedata 926 and a deletion timestamp 928 for each client 924. The valuedata 926, delTime 928, and other aspects of link table 922 are also described in relation to link table 338 shown in FIG. 4.

Computers A, B, and C initially have a legacy directory replica of object 916 that has a multi-valued members attribute 918 which has two values, client1 and client2. In an initial legacy mode, metadata 920 includes a latest version number, v1, and an update timestamp, t1, for the members attribute 918. Also for an initial legacy mode, valuedata 926 for each value (i.e., the clients 924) is null, or zero, and the deletion timestamp 928 is zero to indicate the existence of a particular value.

FIG. 10 shows an instance of object 916 in each of the computers A, B, and C. For simplification, only the link table 922, members attribute 918, and metadata 920 for the members attribute is shown in the figure for each object 916. In this example, computers A and B implement the linked value replication model (i.e., "new mode") described above with respect to FIGS. 4, 5, and 6. Computer C implements the conventional state-based replication model (i.e., "legacy mode").

At computer A, a data administrator adds a new client3 in link table 922(A). Because computer A implements linked value replication, valuedata 926(A) for client3 is initialized to version1 (v1) of the value occurring at time2 (t2). For a linked value replication model, non-null valuedata is a non-zero value (i.e., valuedata 926(A) for client 3). That is, a version of a linked value is one or more and valid timestamp is non-zero. Existent, or non-null, valuedata distinguishes a linked value replication model over an attribute replication model. In the case of a replication conflict, a linked value having non-null valuedata will prevail over a linked value having null valuedata. This establishes a resolution policy that values having conflict resolution data prevail over values without conflict resolution data.

At computer B, a data administrator deletes client2 from link table 922(B). Because computer B implements linked value replication, the deletion timestamp 928(B) for client2 is updated to time3 (t3) to indicate that the value has been identified for deletion. Valuedata 926(B) updates from the null value to version1 (v1) of the value occurring at time3 (t3).

At computer C, a data administrator deletes client1 from link table 922(C). Because computer C is operating in the legacy mode of state-based replication, client1 is actually removed from link table 922(C), rather than being identified for deletion at the value level with a deletion timestamp. In the legacy mode of state-based replication, the value level data is not created. Rather, the attribute level metadata 920(C) is updated to version2 (v2) of the attribute occurring at time4 (t4) to indicate that a value of the members attribute 918(C) has been changed.

FIG. 11 shows the results of computers A, B, and C replicating after the changes to the values in link tables 922(A), 922(B), and 922(C), respectively. Domain controllers (servers, computers, etc.) operating with the linked value replication model cannot replicate from domain controllers operating under the legacy mode of state-based replication. That is, computers A and B cannot replicate from computer C. However, computer C can replicate from computers A and B, but has to first "promote" itself to the new mode prior to replicating with either computer A or B. Computer C promotes itself to implement linked value replication when it first replicates with a computer in the network operating with the linked value replication model.

Replication transition from attribute level to attribute value level occurs in two stages: first at the attribute level (i.e., conventional "legacy" replication), and second at the attribute value level. At the attribute level, attributes having a later version number and/or timestamp are replicated first. This stage of the replication includes only those linked values that do not have valuedata. Subsequently, at the value level, values having more recent valuedata are replicated second. With replication transition, values having null valuedata are included in the attribute level replication stage and excluded from the value level replication stage.

In FIG. 11, computer C first replicates with computer B. Client2 exists on computer C as a legacy value (i.e., valuedata 926(C) and delTime 928(C) for client2 is null, FIG. 10). When replicating with computer B, computer B prevails in a replication conflict because client2 has value level data. Computer C updates valuedata 926(C) and delTime 928(C) for client2 to indicate that the value has been identified to be deleted.

Computer C next replicates with computer A and adds client3 to link table 922(C). Valuedata 926(C) is initialized to version1 (v1) of client3 occurring at time2 (t2). Computer C does not replicate client1 from computer A because client1 is a legacy value having no value level data.

Computer B replicates from computer C and updates the change to the members attribute metadata 920(B) to reflect the update made in computer C. Computer B then accounts for updates and changes at the attribute level (i.e., members attribute 918(B)), and replicates only legacy values without any value level data from computer C. This follows the conventional state based replication model. However, computer C does not have any legacy values without value level data, but rather has client2 and client3 each with valuedata 926(C). Thus, computer B receives an empty list from computer C with no legacy value changes to be made. This indicates to computer B to remove any local legacy values from the link table. Accordingly, computer B removes client1 from link table 922(B).

After accounting for attribute level replication, computer B replicates at the value level implementing the link value replication model. Computer B adds client3 from computer C to link table 922(B) and initializes valuedata 926(B). Computer B does not replicate from computer A because computer B is transitively updated from computer A. Computer C replicates from computer A before computer B replicates from computer C.

Computer A replicates from computer B and updates the change to members attribute metadata 920(A) to reflect the update made in computer B, which was initiated in computer C. Computer A then accounts for updates and changes at the attribute level (i.e., members attribute 918(A)), and replicates only legacy values without any value level data from computer B. However, computer B does not have any legacy values without value level data, but rather has client2 and client3 each with valuedata 926(B). Thus, computer A receives an empty list from computer B with no legacy value changes to be made. This indicates to computer A to remove any local legacy values. Accordingly, computer A removes client1 and client 2 from link table 922(A).

After accounting for attribute level replication, computer A replicates at the value level implementing the link value replication model. Computer A adds client2 (which does not exist because it was just removed) from computer B to link table 922(A) and updates valuedata 926(A) and delTime 928(A) to indicate that client2 has been identified to be deleted. Computer A does not replicate from computer C because computer A is transitively updated from computer C. Computer B replicates from computer C before computer A replicates from computer B.

FIG. 11 shows that computers A, B, and C, have all converged to the same set of values via the link value replication model. The example illustrates how directory partitions are replicated from an existing attribute level to a linked value level. The link value replication model reduces the amount of data that is communicated between domain controllers in a network when replicating directory partitions, reduces the possibilities of replication convergence conflicts, and provides architectural compatibility between a conventional state-based replication model and the link value replication model.

Figure 12:
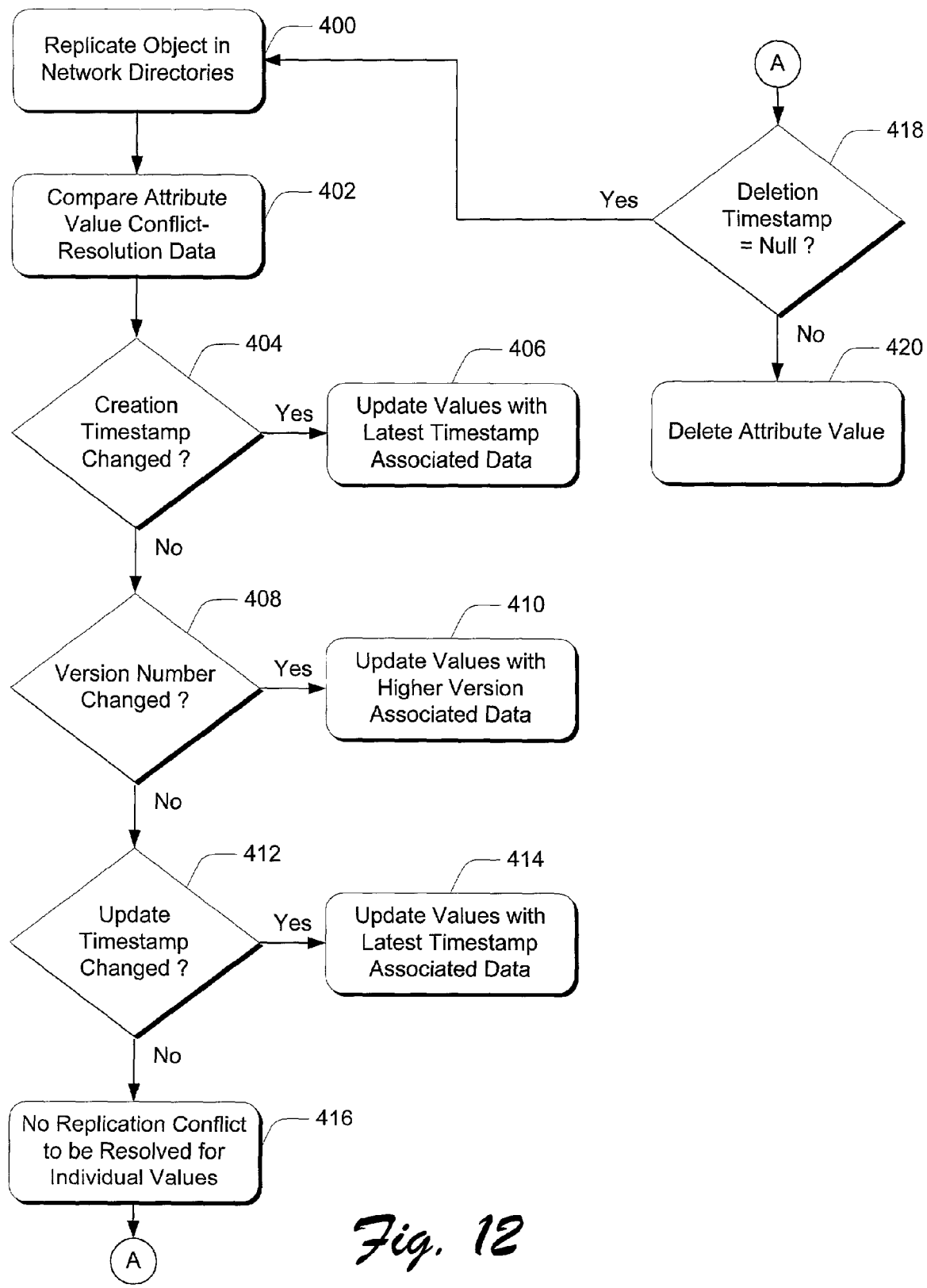
FIG. 12 is a flow diagram of a method for replicating multi-valued object attributes.

FIG. 12 illustrates a method to replicate multi-valued object attributes having attribute-value level conflict-resolution data. At block 400, an object stored in a first directory at a network domain controller is replicated with a replica of the object stored in a second directory at a second network domain controller. The object has a multi-valued attribute comprised of individual values each having associated conflict-resolution data.

At block 402, the conflict-resolution data for the individual values of the object stored in the first directory and of the replica of the object stored in the second directory is compared to determine if a replication conflict exists between the individual values. At block 404, a creation timestamp for the individual values is compared to determine if an attribute value, or the replica of the attribute value, has changed.

If the creation timestamp indicates that one of the values was created after the other (i.e., "yes" from block 404), the attribute value having the earlier creation timestamp is updated with the attribute value that has the later creation timestamp at block 406. That is, the older value created first is replicated with any associated data from the newer value that was created last. If the creation timestamp is the same for the two values (i.e. "no" from block 404), a version number for the individual values is compared to determine if an attribute value, or the replica of the attribute value, has been updated or changed to a new version at block 408.

If the version number indicates that one of the values was updated or changed to a more recent version (i.e., "yes" from block 408), the attribute value having the lower version number is updated with the attribute value that has the higher version number at block 410. That is, the older value with the lower version number is replicated with any associated data from the newer value that was updated or changed last. If the version number is the same for the two values (i.e., "no" from block 408), an update timestamp for the individual values is compared to determine if an attribute value, or the replica of the attribute value, has been updated at block 412.

If the update timestamp indicates that one of the values was updated or changed after the other (yet the version number remains the same) (i.e., "yes" from block 412), the attribute value having the earlier update timestamp is updated with the attribute value that has the later update timestamp at block 414. That is, the older value is replicated with any associated data from the newer value that was updated or changed last. If the update timestamp is the same for the two values (i.e. "no" from block 412), then there is no replication conflict to be resolved between the individual values of the multi-valued object attribute (block 416).

At block 418, a deletion timestamp is evaluated to determine if an individual value has been identified to be deleted. If the deletion timestamp is not null (i.e., "no" from block 418), then the value is deleted from the object attribute at block 420. That is, if a value has been identified to be deleted from the object attribute, then the deletion timestamp will indicate when the value was marked for deletion. If the deletion timestamp indicates null (i.e., "yes" from block 418), then the method continues to replicate directory objects (at block 400).

Exemplary Computing System and Environment

Figure 13:
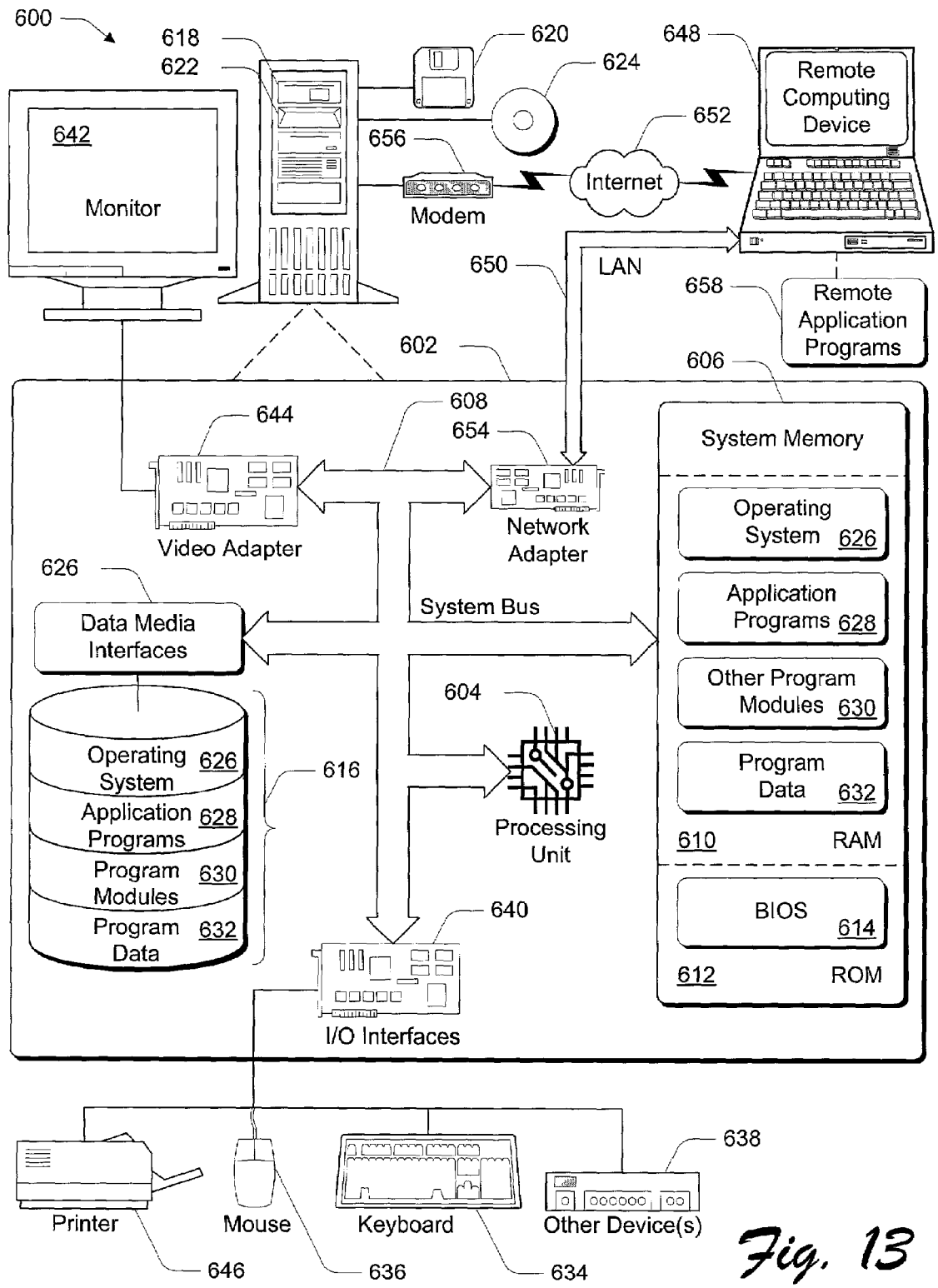
FIG. 13 is a diagram of a computing system and environment that can be utilized to implement the technology described herein.

FIG. 13 illustrates an example of a computing environment 500 within which the computer, network, and system architectures described herein can be either fully or partially implemented. Exemplary computing environment 500 is only one example of a computing system and is not intended to suggest any limitation as to the scope of use or functionality of the network architectures. Neither should the computing environment 500 be interpreted as having any dependency or requirement relating to any one or combination of components illustrated in the exemplary computing environment 500.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that is include any of the above systems or devices, and the like.

Link value replication may be described in the general context of computer-executable instructions, such as program modules, being executed by a computer. Generally, program modules include routines, programs, objects, components, data structures, etc. that perform particular tasks or implement particular abstract data types. Link value replication may also be practiced in distributed computing environments where tasks are performed by remote processing devices that are linked through a communications network. In a distributed computing environment, program modules may be located in both local and remote computer storage media including memory storage devices.

The computing environment 500 includes a general-purpose computing system in the form of a computer 502. The components of computer 502 can include, by are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 502 typically includes a variety of computer readable media. Such media can be any available media that is accessible by computer 502 and includes both volatile and non-volatile media, removable and non-removable media. The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 can also include other removable/non-removable, volatile/non-volatile computer storage media. By way of example, FIG. 13 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 can be connected to the system bus 508 by a SCSI interface (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may include an embodiment of link value replication.

Computer system 502 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 604 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, and the like. The remote computing device 548 is illustrated as a portable computer that can include many or all of the elements and features described herein relative to computer system 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet. When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components, such as the operating system, are illustrated herein as discrete blocks, although it is recognized that such programs and components reside at various times in different storage components of the computer system 502, and are executed by the data processor(s) of the computer.

Conclusion

Although the systems and methods have been described in language specific to structural features and/or methodological steps, it is to be understood that the technology defined in the appended claims is not necessarily limited to the specific features or steps described. Rather, the specific features and steps are disclosed as preferred forms of implementing the claimed invention.

The invention claimed is:

1. A network system, comprising:
a first computer configured to maintain an object comprising a plurality of multi-valued attributes that each have associated values, at least one multi-valued attribute of the object having a link table value that links to a link table which includes a plurality of individual linked values, the individual linked values having associated therewith respective conflict-resolution data, where the first computer is adapted to update the conflict-resolution data associated with at least one linked value in the link table in response to a modification made to the linked value;

at least a second computer configured to replicate the object to generate a replica object comprising the plurality of multi-valued attributes that each have the associated values, and comprising a replica of the link table which includes replicas of the individual linked values having associated therewith respective further conflict-resolution data, where the second computer is adapted to update the further conflict-resolution data associated with a replica linked value in response to a modification made to the replica linked value; and at least one of the first computer and the second computer being further configured to resolve a replication conflict between the linked value of the multi-valued attribute in the object and the replica linked value of the multi-valued attribute in the replica object, the replication conflict arising from the modifications made to the linked value on the first computer and made to the replica linked value on the second computer, and the replication conflict being resolved, at least in part, based upon the conflict-resolution data and the further conflict-resolution data.

2. A network system as recited in claim 1, wherein at least one of the first computer and the second computer is further configured to compare the conflict-resolution data associated with the linked value of the multi-valued attribute in the object and the further conflict-resolution data associated with the replica linked value of the multi-valued attribute in the replica object to resolve the replication conflict.

3. A network system as recited in claim 1, wherein the conflict-resolution data comprises a version indicator that corresponds to a version of the linked value in the object.

4. A network system as recited in claim 1, wherein the conflict-resolution data and the further conflict-resolution data each comprise a respective version number that corresponds to a version of the linked value and the replica linked value, and wherein at least one of the first computer and the second computer is further configured to:

compare the version number that corresponds to the linked value of the multi-valued attribute in the object and the version number that corresponds to the replica linked value of the multi-valued attribute in the replica object to resolve the replication conflict; and update the replica linked value of the multi-valued attribute in the replica object if the replica linked value has a lower version number than the linked value of the multi-valued attribute in the object.

5. A network system as recited in claim 1, wherein the conflict-resolution data comprises an update indicator that corresponds to when the linked value in the object is updated.

6. A network system as recited in claim 1, wherein the conflict-resolution data and the further conflict-resolution data each comprise a respective update timestamp that corresponds to when the linked valued and the replica linked value are updated, and wherein at least one of the first computer and the second computer is further configured to:

compare the update timestamp that corresponds to the linked value of the multi-valued attribute in the object and the update timestamp that corresponds to the linked value of the multi-valued attribute in the replica object to resolve the replication conflict; and update the replica linked value of the multi-valued attribute in the replica object if the replica linked value has an earlier update timestamp than the linked value of the multi-valued attribute in the object.

7. A network system as recited in claim 1, wherein the conflict-resolution data comprises a creation indicator that corresponds to when the linked value in the object is created.

8. A network system as recited in claim 1, wherein the conflict-resolution data and the further conflict-resolution data each comprise a respective creation timestamp that corresponds to when the linked value and the replica linked value are created, and wherein at least one of the first computer and the second computer is further configured to:

compare the creation timestamp that corresponds to the linked value of the multi-valued attribute in the object and the creation timestamp that corresponds to the replica linked value of the multi-valued attribute in the replica object to resolve the replication conflict; and update the replica linked value of the multi-valued attribute in the replica object if the replica linked value has an earlier creation timestamp than the linked value of the multi-valued attribute in the object.

9. A network system as recited in claim 1, wherein the conflict-resolution data comprises a version indicator that corresponds to a version of the linked value, and comprises an update indicator that corresponds to when the linked value is updated.

10. A network system as recited in claim 1, wherein the conflict-resolution data and the further conflict-resolution data each comprise a respective version number that corresponds to a version of the linked value and the replica linked value, and each comprise a respective update timestamp that corresponds to when the linked value and the replica linked value is updated, and wherein at least one of the first computer and the second computer is further configured to:

compare the conflict-resolution data associated with the linked value of the multi-valued attribute in the object and the further conflict-resolution data associated with the linked value of the multi-valued attribute in the replica object; and resolve the replication conflict in favor of whichever of the linked value or the replica linked value that first has a higher version number, and second has a later update timestamp.

11. A network system as recited in claim 1, wherein the conflict-resolution data and the further conflict-resolution data each comprise a respective version number that corresponds to a version of the linked value and the replica linked value, and each comprise a respective update timestamp that corresponds to when the linked value and the replica linked value is updated, and wherein at least one of the first computer and the second computer is further configured to:

compare the conflict-resolution data associated with the linked value of the multi-valued attribute in the object and the further conflict-resolution data associated with the replica linked value of the multi-valued attribute in the replica object to resolve the replication conflict;

update the replica linked value of the multi-valued attribute in the replica object if the replica linked value has a lower version number than the linked value of the multi-valued attribute in the object; and if the version number that corresponds to the replica linked value of the multi-valued attribute in the replica object is equivalent to the version number that corresponds to the linked value of the multi-valued attribute in the object, update the replica linked value of the multi-valued attribute in the replica object if the replica linked value has an earlier update timestamp than the linked value of the multi-valued attribute in the object.

12. A network system as recited in claim 1, wherein the conflict-resolution data comprises a creation indicator that corresponds to when the linked value is created, a version indicator that corresponds to a version of the linked value, and an update indicator that corresponds to when the linked value is updated.

13. A network system as recited in claim 1, wherein the conflict-resolution data and the further conflict-resolution data each comprise a respective creation timestamp that corresponds to when the linked value and the replica linked value is created, each comprise a respective version number that corresponds to a version of the linked value and the replica linked value, and each comprise a respective update timestamp that corresponds to when the linked value and the replica linked value is updated, and wherein at least one of the first computer and the second computer is further configured to:
 compare the conflict-resolution data associated with the linked value of the multi-valued attribute in the object and the further conflict-resolution data associated with the replica linked value of the multi-valued attribute in the replica object; and
 resolve the replication conflict in favor of whichever of the linked value or the replica linked value that first has a later creation timestamp, second has a higher version number, and third has a later update timestamp.

14. A network system as recited in claim 1, wherein the conflict-resolution data and the further conflict-resolution data each comprise a respective creation timestamp that corresponds to when the linked value and the replica linked value is created, each comprise a respective version number that corresponds to a version of the linked value and the replica linked value, and each comprise a respective update timestamp that corresponds to when the linked value and the replica linked value is updated, and wherein at least one of the first computer and the second computer is further configured to:
 compare the conflict-resolution data associated with the linked value of the multi-valued attribute in the object and the further conflict-resolution data associated with the replica linked value of the multi-valued attribute in the replica object to resolve the replication conflict,
 update the replica linked value of the multi-valued attribute in the replica object if the replica linked value has an earlier creation timestamp than the linked value of the multi-valued attribute in the object;
 if the creation timestamp that corresponds to the replica linked value of the multi-valued attribute in the replica object is equivalent to the creation timestamp that corresponds to the linked value of the multi-valued attribute in the object, update the replica linked value of the multi-valued attribute in the replica object if the replica linked value has a lower version number than the linked value of the multi-valued attribute in the object; and
 if the version number that corresponds to the replica linked value of the multi-valued attribute in the replica object is equivalent to the version number that corresponds to the linked value of the multi-valued attribute in the object, update the replica linked value of the multi-valued attribute in the replica object if the replica linked value has an earlier update timestamp than the linked value of the multi-valued attribute in the object.

15. A network system as recited in claim 1, wherein the linked value and the replica linked value each have an associated deletion indicator that is a null identifier to indicate the existence of the linked value of the multi-valued attribute in the object and to indicate the existence of the replica linked value of the multi-valued attribute in the replica object.

16. A network system as recited in claim 1, wherein the linked value and the replica linked value each have an associated deletion indicator that corresponds to when the linked value is marked for deletion from the multi-valued attribute in the object, and when the replica linked value is marked for deletion from the multi-valued attribute in the replica object.

17. A network system as recited in claim 1, wherein the linked value and the replica linked value each have an associated deletion timestamp that corresponds to when the linked value is marked for deletion from the multi-valued attribute in the object, and when the replica linked value is marked for deletion from the multi-valued attribute in the replica object, and wherein the second computer is further configured to delete a replica linked value from the multi-valued attribute in the replica object if the replica linked value has a deletion timestamp that indicates the replica linked value is marked for deletion.

18. A state-based replication system, comprising:
 an object comprising a plurality of multi-valued attributes that each have associated values, at least one multi-valued attribute of the object having a link table value which is a reference link to a link table which includes multiple referenced linked values, at least one of the referenced linked values having associated therewith indicators to indicate a change to the referenced linked value of the multi-valued attribute;
 at least an additional object replicated from the object, the additional object comprising the plurality of multi-valued attributes that each have the associated values, and comprising a replica of the link table which includes a replica of a referenced linked value having associated therewith the indicators to indicate a change to the replica linked value of the multi-valued attribute; and
 a computing device configured to replicate the object and to identify a change to the referenced linked value of the multi-valued attribute in the object or a change to the replica linked value of the multi-valued attribute in the additional object by a change to one or more of the indicators corresponding to the referenced linked values of the object or the additional object.

19. A state-based replication system as recited in claim 18, wherein the indicators comprise a version indicator that corresponds to a version of the referenced linked value.

20. A state-based replication system as recited in claim 18, wherein the indicators comprise an update indicator that corresponds to when the referenced linked value is changed.

21. A state-based replication system as recited in claim 18, wherein the indicators comprise a creation indicator that corresponds to when the referenced linked value is created.

22. A state-based replication system as recited in claim 18, wherein the indicators comprise a version number that corresponds to a version of the referenced linked value and an update timestamp that corresponds to when the referenced linked value is changed.

23. A state-based replication system as recited in claim 18, wherein the indicators comprise a creation timestamp that corresponds to when the referenced linked value is created, a version number that corresponds to a version of the referenced linked value, and an update timestamp that corresponds to when the referenced linked value is changed.

24. A state-based replication system as recited in claim 18, wherein the indicators comprise a deletion indicator that has a null identifier to indicate the existence of the referenced linked value of the multi-valued attribute.

25. A state-based replication system as recited in claim 18, wherein the indicators comprise a deletion timestamp that corresponds to when the referenced linked value is marked for deletion from the multi-valued attribute.

26. A state-based replication system as recited in claim 18, wherein the computing device is further configured to:
    compare the indicators associated with the referenced linked value of the multi-valued attribute in the object with the indicators associated with the replica linked value of the multi-valued attribute in the additional object;
    identify a replication conflict; and
    resolve the replication conflict with the indicators associated with the referenced link value and the replica linked value.

27. A method, comprising:
    replicating an object stored in a first directory with a replica object stored in a second directory, the object and the replica object comprising a plurality of multi-valued attributes that each have associated values, at least one multi-valued attribute having a link table value that is a reference to a link table which includes to multiple linked values, the multiple linked values having respective conflict-resolution data associated therewith;
    comparing an individual linked value of the multi-valued attribute in the object with a replica linked value of the multi-valued attribute in the replica object to identify a replication conflict; and
    resolving the replication conflict with the conflict-resolution data associated with the individual linked value and the replica linked value.

28. A method as recited in claim 27, wherein the conflict-resolution data comprises a version number that corresponds to a version of the individual linked value, and wherein said comparing comprises determining if the individual linked value version number has been changed.

29. A method as recited in claim 27, wherein the conflict-resolution data comprises a version number that corresponds to respective versions of the individual linked value and the replica linked value, said comparing comprises determining if the individual linked value version number or the replica linked value version number has been changed, and the method further comprises updating whichever of the individual linked value or the replica linked value of the multi-valued attribute that has a lower version number with the individual linked value or the replica linked value of the multi-valued attribute that has a higher version number.

30. A method as recited in claim 27, wherein the conflict-resolution data comprises an update timestamp that corresponds to when the individual linked value is changed, and wherein said comparing comprises determining if the individual linked value update timestamp has been changed.

31. A method as recited in claim 27, wherein the conflict-resolution data comprises an update timestamp that corresponds to respective versions of when the individual linked value or the replica linked value is changed, said comparing comprises determining if the individual linked value update timestamp or the replica linked value update timestamp has been changed, and the method further comprises updating whichever of the individual linked value or the replica linked value of the multi-valued attribute that has an earlier update timestamp with the individual linked value or the replica linked value of the multi-valued attribute that has a later update timestamp.

32. A method as recited in claim 27, wherein the conflict-resolution data comprises a creation timestamp that corresponds to when the individual linked value is created, and wherein said comparing comprises determining if a creation timestamp has been changed.

33. A method as recited in claim 27, wherein the conflict-resolution data comprises a creation timestamp that corresponds to respective versions when an the individual linked value or the replica linked value is created, said comparing comprises determining if a creation timestamp has been changed, the method further comprises updating whichever of the individual linked value or the replica linked value of the multi-valued attribute that has an earlier creation timestamp with the individual linked value or the replica linked value of the multi-valued attribute that has a later creation timestamp.

34. A method as recited in claim 27, wherein the conflict-resolution data comprises a version number that corresponds to a version of the individual linked value and an update timestamp that corresponds to when the individual linked value is changed, and wherein said comparing comprises determining if the individual linked value version number has been changed and if the individual linked value update timestamp has been changed.

35. A method as recited in claim 27, wherein the conflict-resolution data comprises a version number that corresponds to a version of the individual linked value and an update timestamp that corresponds to when the individual linked value is changed, and the method further comprises updating the individual linked value of the multi-valued attribute that first has a lower version number, and second has an earlier update timestamp.

36. A method as recited in claim 27, wherein the conflict-resolution data comprises a creation timestamp that corresponds to when the individual linked value is created, a version number that corresponds to a version of the individual linked value, and an update timestamp that corresponds to when the individual linked value is changed, and wherein said comparing comprises determining if the individual linked value creation timestamp has been changed, if the individual linked value version number has been changed, and if the individual linked value update timestamp has been changed.

37. A method as recited in claim 27, wherein the conflict-resolution data comprises a creation timestamp that corresponds to when the individual linked value is created, a version number tat corresponds to a version of the individual linked value, and an update timestamp that corresponds to when the individual linked value is changed, and the method further comprises updating the individual linked value of the multi-valued attribute that first has an earlier creation timestamp, second has a lower version number, and third has an earlier update timestamp.

38. A method as recited in claim 27, wherein the individual linked values have a deletion timestamp that is a null identifier to indicate the existence of a linked value of the multi-valued attribute.

39. A method as recited in claim 27, wherein the individual linked values have a deletion timestamp that corresponds to when an individual linked value is marked for deletion from the multi-valued attribute.

40. A method as recited in claim 27, wherein the individual linked values have a deletion timestamp that corresponds to when an individual linked value is marked for deletion from the multi-valued attribute, and the method further comprises deleting a linked value from the multi-valued attribute if the linked value has a deletion timestamp that indicates the linked value is marked for deletion.

* * * * *